US011384582B2

(12) United States Patent
Marick

(10) Patent No.: US 11,384,582 B2
(45) Date of Patent: ***Jul. 12, 2022

(54) HINGE AND METHODS OF MOUNTING AND USING A HINGE

(71) Applicant: Timothy Marick, Grover, CO (US)

(72) Inventor: Timothy Marick, Grover, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,591

(22) Filed: Jun. 3, 2021

(65) Prior Publication Data

US 2021/0293069 A1 Sep. 23, 2021

Related U.S. Application Data

(63) Continuation of application No. 16/824,462, filed on Mar. 19, 2020, now Pat. No. 11,053,720.

(51) Int. Cl.
| | |
|---|---|
| *E05D 15/54* | (2006.01) |
| *E05D 3/08* | (2006.01) |
| *E05D 5/12* | (2006.01) |
| *E05D 3/12* | (2006.01) |
| *E05D 3/14* | (2006.01) |
| *A01K 1/00* | (2006.01) |

(52) U.S. Cl.
CPC ............... *E05D 15/54* (2013.01); *E05D 3/08* (2013.01); *E05D 3/12* (2013.01); *E05D 3/14* (2013.01); *E05D 5/121* (2013.01); *A01K 1/0017* (2013.01); *E05D 2005/122* (2013.01)

(58) Field of Classification Search
CPC .. E05D 15/54; E05D 3/14; E05D 3/08; E05D 3/12; E05D 5/121; E05D 2005/122; E05D 3/186; A01K 1/0017; E06B 11/027
See application file for complete search history.

(56) References Cited

U.S. PATENT DOCUMENTS

| | | | |
|---|---|---|---|
| 256,661 A | 4/1882 | Tarragon | |
| 683,222 A * | 9/1901 | Pearson | ................... E05D 3/12 16/366 |
| 772,417 A | 10/1904 | Kidd | |
| 1,224,036 A | 4/1917 | Sutton | |
| 1,293,335 A | 2/1919 | Chambliss | |
| 1,330,404 A | 2/1920 | Sommer | |

(Continued)

FOREIGN PATENT DOCUMENTS

| | | |
|---|---|---|
| AU | 2017200349 A1 | 2/2017 |
| CN | 1210943 A | 3/1999 |

(Continued)

OTHER PUBLICATIONS

Coon River Gate Company. Products; Website, https://www.coonrivergatecompany.com/products/, originally downloaded Aug. 10, 2020, 6 pages.

(Continued)

*Primary Examiner* — Jeffrey O'Brien
(74) *Attorney, Agent, or Firm* — Craig R. Miles; CR Miles P.C.

(57) ABSTRACT

A hinge permitting a gate to rotate approximately 180 degrees in either direction. The hinge includes first, second, third, and fourth hinge members and first, second, third, and fourth crossbars. The first, second, third, and fourth crossbars form an interpivoting connection with the first, second, third, and fourth hinge members.

17 Claims, 12 Drawing Sheets

(56) References Cited

U.S. PATENT DOCUMENTS

| | | | |
|---|---|---|---|
| 1,331,117 A | 2/1920 | Miller | |
| 1,407,740 A * | 2/1922 | Evans, Jr. | E05D 3/14 16/370 |
| 1,499,120 A | 6/1924 | Nies | |
| 1,505,039 A | 8/1924 | Lay | |
| 2,021,702 A * | 11/1935 | Soss | E05D 3/16 16/369 |
| 2,044,658 A | 6/1936 | Abbey | |
| 2,178,271 A * | 10/1939 | Soss | E05D 3/186 16/358 |
| 2,517,386 A | 8/1950 | Cooper | |
| 2,581,318 A | 1/1952 | Bartlett | |
| 2,585,481 A | 2/1952 | Martin | |
| 2,592,736 A | 4/1952 | Puckett | |
| 2,629,191 A | 2/1953 | Koch et al. | |
| 2,786,289 A | 3/1957 | Koch | |
| 2,822,630 A | 2/1958 | Guyer | |
| 3,002,493 A | 10/1961 | Galamba | |
| 3,022,590 A | 2/1962 | Ohlhausen | |
| 3,030,717 A | 4/1962 | Lewis | |
| 3,089,267 A | 5/1963 | Wooden | |
| 3,135,267 A | 6/1964 | Liebig | |
| 3,170,258 A | 2/1965 | Ohlhausen | |
| 3,203,033 A | 8/1965 | Banse | |
| 3,204,606 A | 9/1965 | Parr et al. | |
| 3,215,118 A | 11/1965 | Behlen | |
| 3,296,741 A | 1/1967 | Lubmann | |
| 3,299,572 A | 1/1967 | Wallace | |
| 3,300,898 A | 1/1967 | Etnyre | |
| 3,387,825 A | 6/1968 | Kreeger | |
| 3,435,557 A * | 4/1969 | Johnson | E06B 11/02 49/70 |
| 3,533,189 A | 10/1970 | Appell et al. | |
| 3,545,407 A | 12/1970 | Moore | |
| 3,648,980 A | 3/1972 | Taylor | |
| 3,767,167 A * | 10/1973 | Rasmussen | A01K 1/0005 256/73 |
| 3,825,053 A | 6/1974 | Romberg | |
| 3,854,243 A | 12/1974 | Walker | |
| 3,854,244 A | 12/1974 | Walker | |
| 3,908,311 A | 9/1975 | Romberg | |
| 3,956,888 A | 5/1976 | Miyada | |
| 19,464 A | 4/1977 | Miller | |
| 4,148,277 A | 4/1979 | Engle et al. | |
| 4,193,377 A | 3/1980 | Weldy | |
| 4,201,157 A | 5/1980 | Lambert | |
| 4,250,836 A | 2/1981 | Smith | |
| 4,302,908 A | 12/1981 | Parker | |
| 4,341,181 A | 7/1982 | Fair | |
| 4,356,999 A * | 11/1982 | McShane | A01K 3/00 256/73 |
| 4,584,655 A | 4/1986 | Funk et al. | |
| 4,607,455 A | 8/1986 | Bluem et al. | |
| 4,781,037 A | 11/1988 | Willibald | |
| 4,787,603 A | 11/1988 | Norton | |
| 4,821,373 A | 4/1989 | Maidment et al. | |
| 4,823,858 A * | 4/1989 | Perutz | E04B 2/7405 16/366 |
| 4,825,930 A | 5/1989 | Lindberg et al. | |
| 4,917,048 A | 4/1990 | Beattie et al. | |
| 4,924,813 A | 5/1990 | Bixler et al. | |
| 4,960,074 A | 10/1990 | Wilson | |
| 4,995,144 A * | 2/1991 | Gateley | E05D 3/08 16/261 |
| 5,042,198 A * | 8/1991 | Privratsky | E06B 11/04 49/248 |
| 5,058,863 A | 10/1991 | Maffet | |
| 5,115,763 A | 5/1992 | Wilson | |
| 5,237,960 A | 8/1993 | Wilson | |
| 5,282,336 A | 2/1994 | Tucker | |
| 5,362,030 A | 11/1994 | Iler, Jr. et al. | |
| 5,410,779 A * | 5/1995 | Esman | E05D 3/14 16/370 |
| 5,588,180 A * | 12/1996 | Chester | A47B 3/12 16/386 |
| 5,782,282 A * | 7/1998 | Chen | E05D 3/12 160/40 |
| 5,860,250 A | 1/1999 | Hill et al. | |
| 5,899,171 A | 5/1999 | Abrahamson | |
| 5,996,973 A | 12/1999 | Campbell | |
| 6,067,940 A | 5/2000 | Holder | |
| 6,073,396 A | 6/2000 | Kietzmann | |
| 6,073,673 A | 6/2000 | Janutta | |
| 6,142,453 A | 11/2000 | Martin | |
| 6,167,842 B1 | 1/2001 | Akins et al. | |
| 6,192,629 B1 | 2/2001 | Akins et al. | |
| 6,450,124 B1 | 9/2002 | Calvert et al. | |
| 6,467,433 B1 | 10/2002 | Stanton et al. | |
| 6,477,985 B1 | 11/2002 | Mennenga et al. | |
| 6,554,257 B1 * | 4/2003 | Kenton | E04H 17/18 256/65.14 |
| 6,574,837 B2 | 6/2003 | Jantschek | |
| 7,155,779 B2 | 1/2007 | Watkins | |
| 7,328,481 B2 * | 2/2008 | Barnett | H04M 1/022 16/227 |
| 7,350,480 B1 | 4/2008 | Hughes | |
| 7,469,448 B1 * | 12/2008 | Forester | E05D 3/14 16/366 |
| 8,075,033 B1 | 12/2011 | McElroy | |
| 8,286,305 B2 | 10/2012 | Singleton | |
| 8,286,587 B2 | 10/2012 | Sladkowski et al. | |
| 8,438,995 B1 | 5/2013 | Donahue et al. | |
| 8,529,423 B2 | 9/2013 | Imazu et al. | |
| 8,534,230 B2 | 9/2013 | Wilson | |
| 8,713,851 B2 | 5/2014 | Flannery et al. | |
| 8,826,495 B2 | 9/2014 | Jauvtis et al. | |
| 9,121,189 B2 | 9/2015 | Hixson et al. | |
| 9,151,108 B1 | 10/2015 | Flannery et al. | |
| 9,226,476 B2 | 1/2016 | Wilson | |
| 9,591,829 B2 | 3/2017 | Beavers | |
| 9,622,453 B2 | 4/2017 | Wilson | |
| 9,874,056 B1 | 1/2018 | Flannery et al. | |
| 9,907,289 B2 | 3/2018 | Arnold et al. | |
| 9,968,071 B1 * | 5/2018 | Smith | E06B 11/04 |
| 10,006,243 B1 | 6/2018 | Flannery et al. | |
| 10,203,928 B2 | 2/2019 | Zhao et al. | |
| 10,627,873 B2 * | 4/2020 | Lan | G06F 1/1616 |
| 10,752,330 B2 * | 8/2020 | Smithson | E05C 7/00 |
| 2002/0148411 A1 | 10/2002 | Markham | |
| 2003/0146426 A1 * | 8/2003 | Ray | A01K 3/00 256/59 |
| 2003/0209206 A1 | 11/2003 | Campbell | |
| 2003/0209208 A1 | 11/2003 | Campbell et al. | |
| 2004/0212968 A1 * | 10/2004 | Lin | G06F 1/1681 361/755 |
| 2005/0212017 A1 * | 9/2005 | Heisserer | A01K 1/0017 257/257 |
| 2006/0070582 A1 | 4/2006 | Prescott | |
| 2006/0101619 A1 * | 5/2006 | Tai | G06F 1/1601 16/366 |
| 2006/0226406 A1 | 10/2006 | Vise et al. | |
| 2007/0170411 A1 | 7/2007 | Ribak | |
| 2007/0210293 A1 | 9/2007 | Cheng | |
| 2007/0246696 A1 | 10/2007 | Campbell | |
| 2008/0289146 A1 * | 11/2008 | Chen | E05D 3/186 16/372 |
| 2008/0289147 A1 * | 11/2008 | Falato | E05D 3/12 16/382 |
| 2008/0296548 A1 | 12/2008 | McDonald | |
| 2009/0000564 A1 | 1/2009 | Meyer, Jr. | |
| 2009/0056078 A1 * | 3/2009 | Njaastad | H04N 1/00519 16/382 |
| 2010/0319630 A1 | 12/2010 | Treadway et al. | |
| 2012/0223283 A1 | 9/2012 | Kobayashi et al. | |
| 2012/0279146 A1 | 11/2012 | Thomas et al. | |
| 2013/0001493 A1 | 1/2013 | Svedberg | |
| 2014/0145046 A1 * | 5/2014 | Layne | E04H 17/22 248/188.1 |
| 2014/0209128 A1 | 7/2014 | Abdul-Ali | |
| 2015/0196006 A1 | 7/2015 | Scudder et al. | |
| 2015/0334987 A1 | 11/2015 | Schwartz | |

(56) References Cited

U.S. PATENT DOCUMENTS

| | | | |
|---|---|---|---|
| 2017/0284136 A1 | 10/2017 | Ramsey | |
| 2018/0195791 A1* | 7/2018 | Wu | E05D 3/14 |
| 2019/0283088 A1 | 9/2019 | Abdul-Ali | |
| 2019/0368247 A1* | 12/2019 | Carbone | F25D 23/028 |
| 2020/0270924 A1* | 8/2020 | Principe | E05F 1/1253 |
| 2020/0291718 A1* | 9/2020 | Turner | E05D 1/00 |
| 2020/0318406 A1* | 10/2020 | Branch | E05D 3/12 |

FOREIGN PATENT DOCUMENTS

| | | |
|---|---|---|
| CN | 101602430 A | 12/2009 |
| CN | 101736972 A | 6/2010 |
| GB | 2566595 A | 3/2019 |
| JP | 3007303 U | 2/1995 |
| KR | 20180017061 A | 2/2018 |
| SU | WO 1991/015646 A1 | 10/1991 |

OTHER PUBLICATIONS

Double J MFG & RPR, Inc. Swing Gates. Website, https://www.doublejmfg.com/gates, originally downloaded Aug. 10, 2020, 2 pages.

British Farming Forum. Website, http://farmingforum.co.uk/forums.showthread.php?18957-360-degree-gate-hinge, originally downloaded Aug. 17, 2020, 5 pages.

Level Welding. Freestanding Corral Panels. Website, http://levelwelding.com/freestanding-corral-panels/, originally downloaded Aug. 10, 2020, 2 pages.

Ranchers Livestock Equipment. Gates. Website, http://www.rancherslivestockequipment.com, originally downloaded Jan. 20, 2020, 2 pages.

Youtube. EnduraGate Demonstration. Website, http://youtube.com/watch?v=CL99brUjZHs, posted Mar. 16, 2015, originally downloaded Aug. 17, 2020, 1 page.

Youtube. Hinge enabling 360 deg. rotation 1. Website, https://www.youtube.com/watch?v=pl8tq3Z76is, posted Feb. 26, 2012, originally downloaded Aug. 17, 2020, 1 page.

Youtube. Hinge enabling 360 deg. rotation 2. Website, https://www.youtube.com/watch?v=gItkHi0Rink, posted Mar. 29, 2014, originally downloaded Aug. 17, 2020, 1 page U.S. Appl. No. 16/824,462, filed Mar. 19, 2020.

* cited by examiner

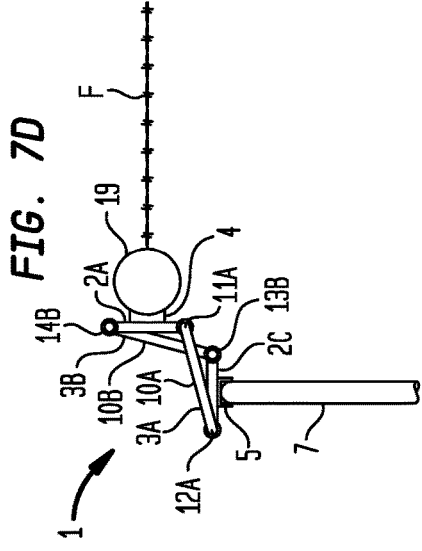
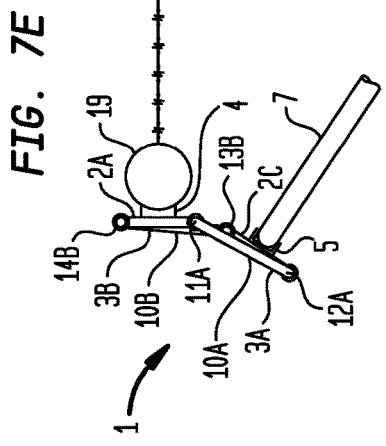
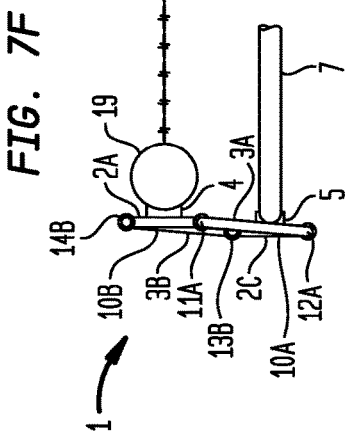
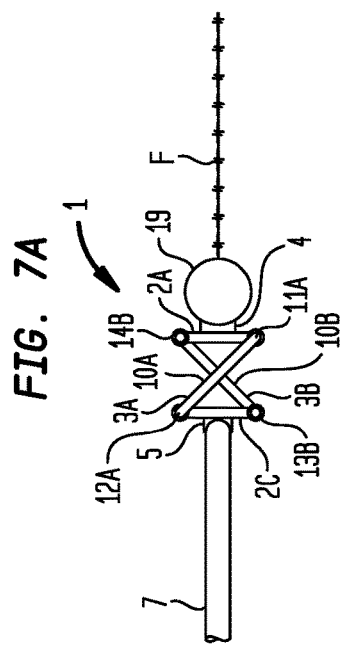
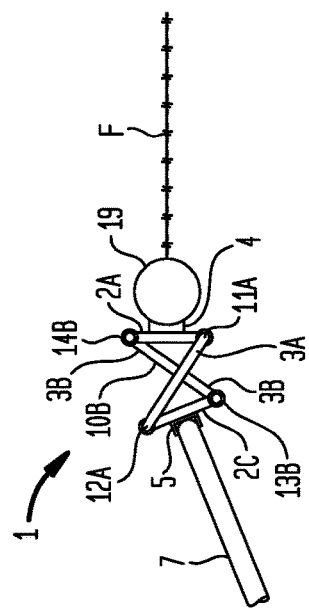

HINGE AND METHODS OF MOUNTING AND USING A HINGE

I. FIELD OF THE INVENTION

Embodiments of the present disclosure relate generally to hinges, and more particularly, relate to gate hinges used in livestock fencing.

II. BACKGROUND OF THE INVENTION

In handling livestock, it is sometimes necessary to move the livestock in herds through gates between fenced ranges or lanes. Domesticated animals can stop short and push back upon approaching the gateway, or crowd into the gateway to the point that too many animals are attempting to pass through at the same time. A herd of domesticated cattle, for example, with each adult weighing as much as two thousand (2,000) pounds, and every cow within the herd having poor depth perception, can be unstoppable, trampling through a partially opened iron gate that is in the herd's lane.

III. SUMMARY OF THE INVENTION

A broad object of embodiments can be a hinge including first, second, third, and fourth hinge members and first, second, third, and fourth crossbars. The first hinge member and the second hinge member can be fixably attached but removably coupled to a post along a first vertical axis of the post. The third hinge member and the fourth hinge member can be fixably attached but removably coupled to a hinge end of a gate along a second vertical axis of the gate. The first, second, third, and fourth crossbars can be in interpivoting connection with the first, second, third, and fourth hinge members. The hinge can be operable to rotate with the gate to either an inward side of a fence attached to the post or an outward side of the fence attached to the post. The hinge can permit the gate to swing approximately 360 degrees with respect to the post.

Naturally, further objects of the invention are disclosed throughout other areas of the specification, drawings, photographs, and claims.

IV. BRIEF DESCRIPTION OF THE DRAWINGS

FIG. 7A is a top plan view of an embodiment of a hinge, a portion of a gate, a post, and a portion of a fence illustrating the gate in a closed position.

FIG. 7B is a top plan view of an embodiment of a hinge, a portion of a gate, a post, and a portion of a fence illustrating the gate swinging into the outward side of the fence.

FIG. 7C is a top plan view of an embodiment of a hinge, a portion of a gate, a post, and a portion of a fence illustrating the gate swinging into the outward side of the fence.

FIG. 7D is a top plan view of an embodiment of a hinge, a portion of a gate, a post, and a portion of a fence illustrating the gate swinging into the outward side of the fence.

FIG. 7E is a top plan view of an embodiment of a hinge, a portion of a gate, a post, and a portion of a fence illustrating the gate swinging into the outward side of the fence.

FIG. 7F is a top plan view of an embodiment of a hinge, a portion of a gate, a post, and a portion of a fence illustrating the gate swinging into the outward side of the fence.

V. DETAILED DESCRIPTION OF THE INVENTION

Embodiments of a hinge and methods for mounting and using a hinge are described herein and illustrated in the accompanying figures. The hinge can be used with livestock fencing and gate systems which are often used on ranches and farms; however, the illustrative examples provided are not intended to preclude embodiments of the hinge that can have applications outside the scope of ranching and farming.

Figure 1:
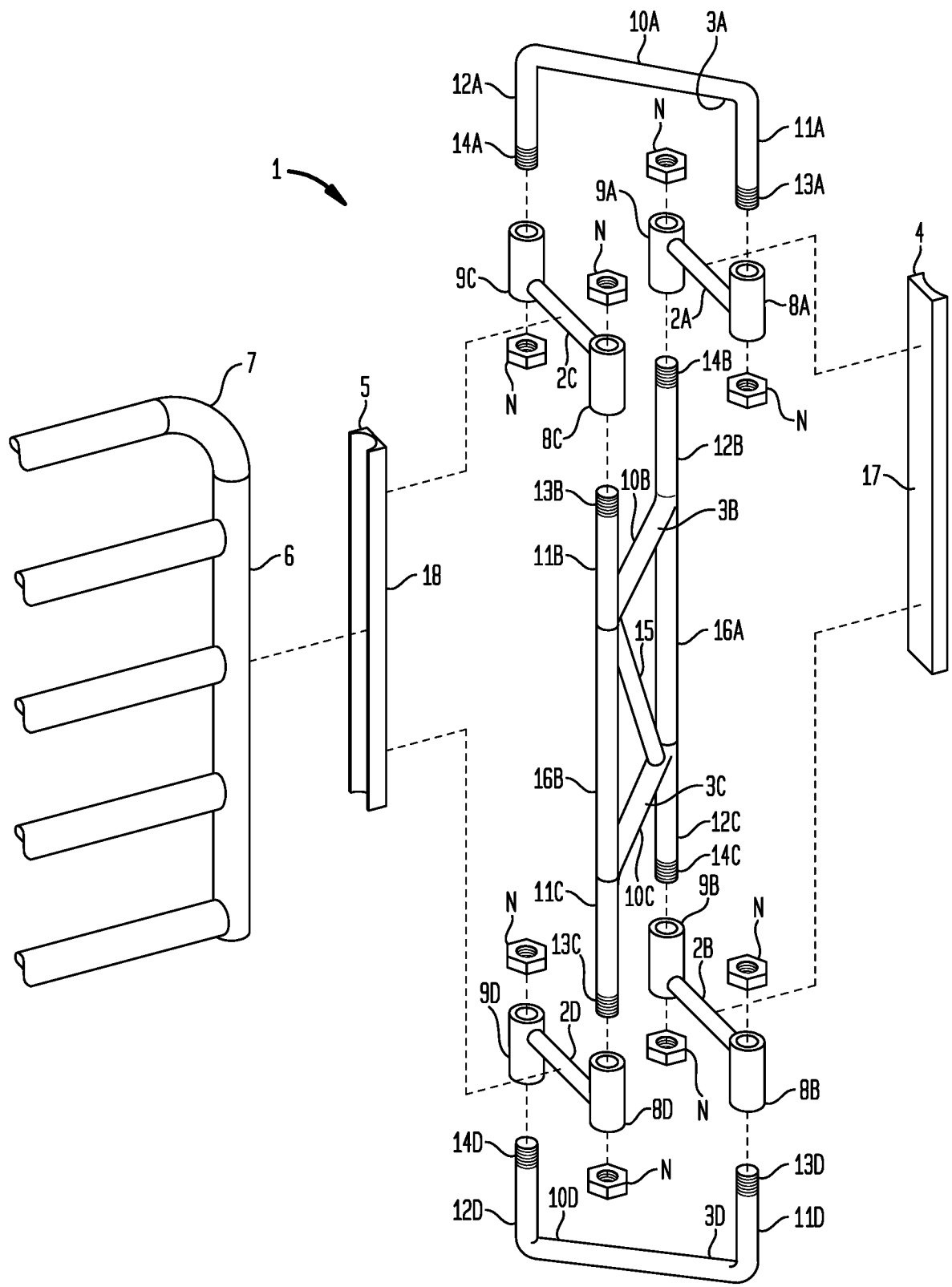
FIG. 1 is an exploded view of an embodiment of a hinge and a portion of a gate.

Now referring to the figures wherein like reference numerals denote like structure throughout the specification, with reference primarily to FIG. 1, a hinge (1), including first hinge member (2A), second hinge member (2B), third hinge member (2C), fourth hinge member (2D), first crossbar (3A), second crossbar (3B), third crossbar (3C), and fourth crossbar (3D) is depicted. First hinge member (2A) and second hinge member (2B) of the hinge (1) can, but not necessarily, be fixably attached to post brace (4). Third hinge member (2C) and fourth hinge member (2D) can, but not necessarily, be fixably attached to a gate brace (5).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

In various embodiments of the hinge (1), hinge members (2A-2D), crossbars (3A-3D), post brace (4), and gate brace (5) can, but not necessarily, be made from metal, including or consisting of iron and steel or various alloys of steel comprising iron and carbon. As a particular example, wrought iron is a rugged, malleable form of iron suitable for forging or rolling rather than casting. Also, the addition of various other metals to steel can be used to produce alloys that have different properties. Chromium, as an example, can be added to steel, to form stainless steel. A metal coating such as aluminum may be applied, as another example. These examples of iron and steel alloys are not intended to preclude embodiments which incorporate similar or equivalent materials, such as engineered timber and different metal composites, currently or prospectively available.

Again with continuing reference primarily to FIG. 1, first crossbar (3A), second crossbar (3B), third crossbar (3C) and fourth crossbar (3D) can form an interpivoting connection with first hinge member (2A), second hinge member (2B), third hinge member (2C), and fourth hinge member (2D) of the hinge (1). The interpivoting connection can, but not necessarily, be a pintle and gudgeon relationship. First (2A), second (2B), third (2C), and fourth (2D) hinge members (2A-2D) of hinge (1), can include pairs of socket-like, cylindrical gudgeons (8A-8D, 9A-9D) which can be oppositely flanked as first (8A-8D) and second (9A-9D) gudgeons (8A-8D, 9A-9D) on each hinge member (2A-2D). First crossbar (3A), second crossbar (3B), third crossbar (3C) and fourth crossbar (3D) can each include an elongated shank portion (10A-10D) extending between the first end (11A-11D) and the second end (12A-12D) of the crossbars (3A-3D). A transition into a pintle portion (13A-13D, 14A-14D) of each end (11A-11D, 12A-12D) of the crossbars (3A-3D) can be included as the male counterpart to each of the female-type gudgeons (8A-8D, 9A-9D), forming an interpivoting connection, which can, but not necessarily, be easily separated. Each pintle portion (13A-13D, 14A-14D) can, but not necessarily, be pivotably coupled to each gudgeon (8A-8D, 9A-9D) in a cross-over or offset pattern, in which the first crossbars (3A) and the second crossbar (3B) pivotably couple to the top two hinge members (2A, 2C), while the third crossbar (3C) and fourth crossbar (3D) pivotably couple to the bottom two hinge members (2B, 2D). Each pintle portion (13A-13D, 14A-14D) of each crossbar (3A-3D) can be threadably connected with a nut (N) to each gudgeon (8A-8D, 9A-9D) of each hinge member (2A-2D).

In an embodiment of the hinge (1), the crossbars (3A-3D) can be fixably attached to bolts or pins, which can then form the pintle portions (13A-13D, 14A-14D) of the crossbars (3A-3D) for insertion through the axially aligned gudgeons (8A-8D, 9A-9D) of the hinge members (2A-2D) to effectively pivotably couple each crossbar (3A-3D) to each hinge member (2A-2D). The illustrative examples of the pintle portions (13A-13D, 14A-14D) and gudgeons (8A-8D, 9A-9D) of the hinge (1) are not intended to preclude embodiments, currently or prospectively available, which incorporate similar or equivalent male fittings attached to a first component, and/or similar or equivalent female fittings attached to a second component, that when coupled together enable a pivoting or hinging connection between the first and second components.

Again with continuing reference primarily to FIG. 1, first pintle portion (13A) of first crossbar (3A) can pivotably couple to first gudgeon (8A) of first hinge member (2A) and second pintle portion (14A) of first crossbar (3A) can pivotably couple to second gudgeon (9C) of third hinge member (2C). First pintle portion (13B) of second crossbar (3B) can pivotably couple to first gudgeon (8C) of third crossbar (2C) and second pintle portion (14B) of second crossbar (3B) can pivotably couple to second gudgeon (9A) of first hinge member (2A). First pintle portion (13C) of third crossbar (3C) can pivotably couple to first gudgeon (8D) of fourth hinge member (2D) and second pintle portion (14C) of third crossbar (3C) can pivotably couple to second gudgeon (9B) of second hinge member (2B). First pintle portion (13D) of fourth crossbar (3D) can pivotably couple to first gudgeon (8B) of second hinge member (2B) and second pintle portion (14D) of fourth crossbar (3D) can pivotably couple to second gudgeon (9D) of fourth hinge member (2D).

Figure 2:
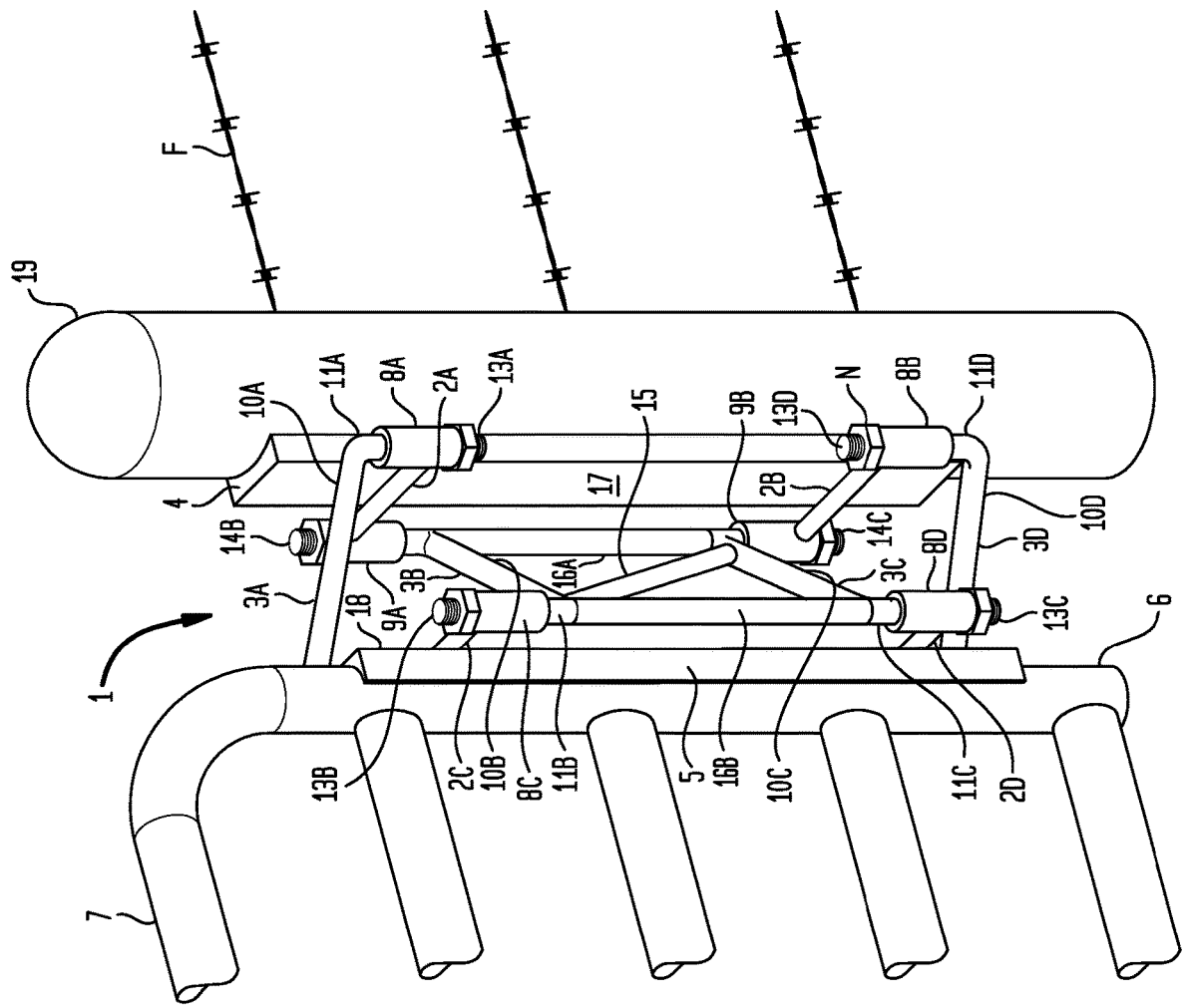
FIG. 2 is a side elevational view of an embodiment of a hinge, a portion of a gate, a post, and a portion of a fence.

Now referring primarily to FIG. 2, post brace (4) can be coupled to post (19), which may be attached to a fence (F) and gate brace can be coupled to hinge end (6) of gate (7). In another embodiment, the first hinge member (2A) and second hinge member (2B) can be fixably attached but removably coupled to post (19) and third hinge member (2C) and fourth hinge member (2D) can be fixably attached but removably coupled to hinge end (6) of gate (7). Welding, as an example, can be used in an embodiment of the hinge (1) to join the hinge members (2A-2D) to the post (19) and post brace (4) or to the hinge end (6) of the gate (7) and gate brace (5). Also, alternatives to welding, such as spot welding, riveting, brazing, soldering, gluing, and hardware assemblies consisting of U-bolts; V-bolts; and J-bolts, can be used.

In various embodiments of the hinge (1), post (19) can be a tree stump or other organic or inorganic object having a first vertical axis in which to fixably attach first (2A) and second (2B) hinge members (2A, 2B), in substantially parallel alignment with a second vertical axis of the third (2C) and fourth (2D) hinge members (2C, 2D) of the hinge end (6) of the gate (7). Fence (F) attached to the post (19) can, but not necessarily, be a barbed wire fence; either standard barbed wire with various spacing, or suspension barbed wire; a rail fence made from plastic or wooden boards; a woven wire fence; a cable wire fence; a mesh wire fence; a high-tensile fence; an electric fence; or the like.

Figure 3:
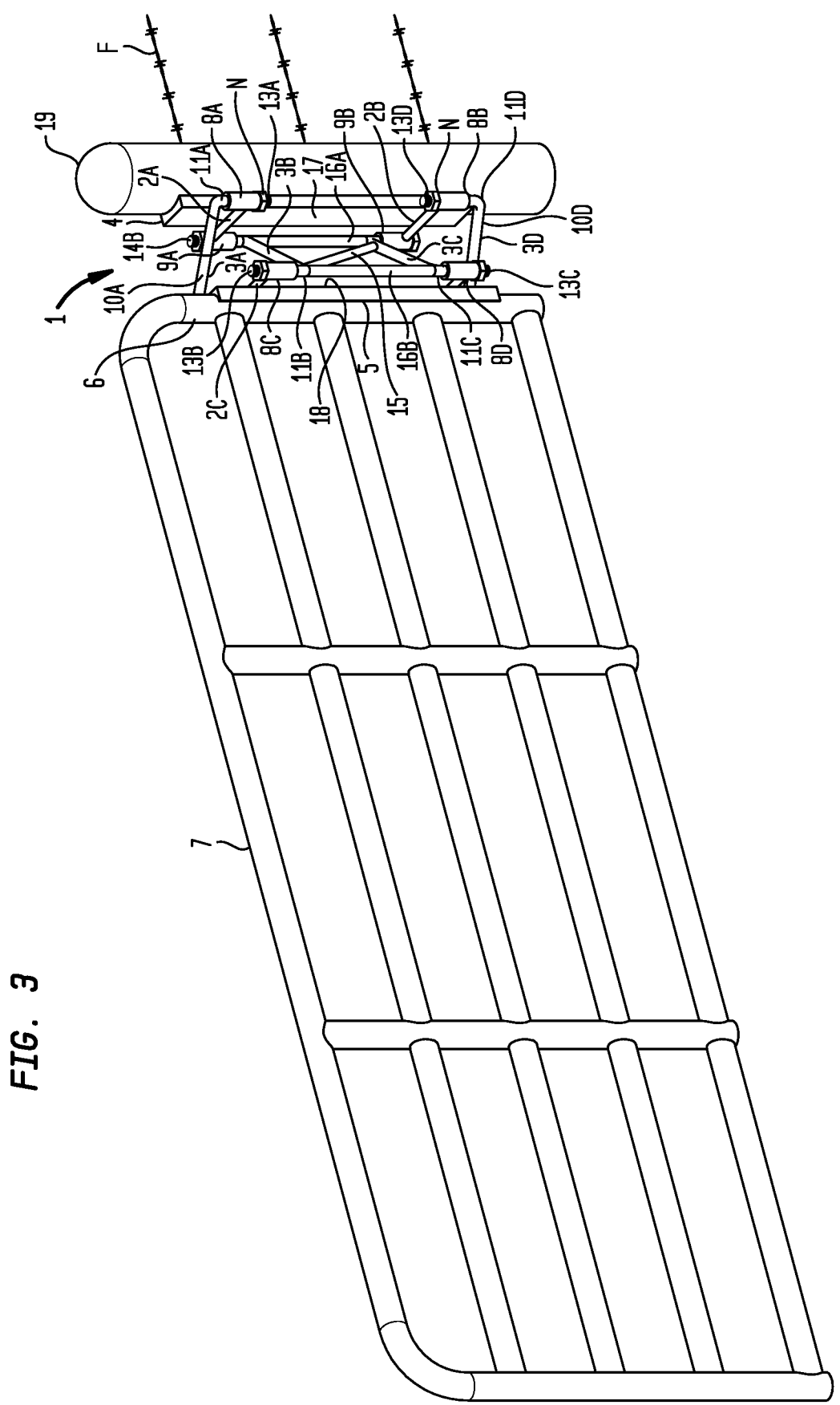
FIG. 3 is a side elevational view of an embodiment of a hinge, a gate, a post, and a portion of a fence.
Figure 4:
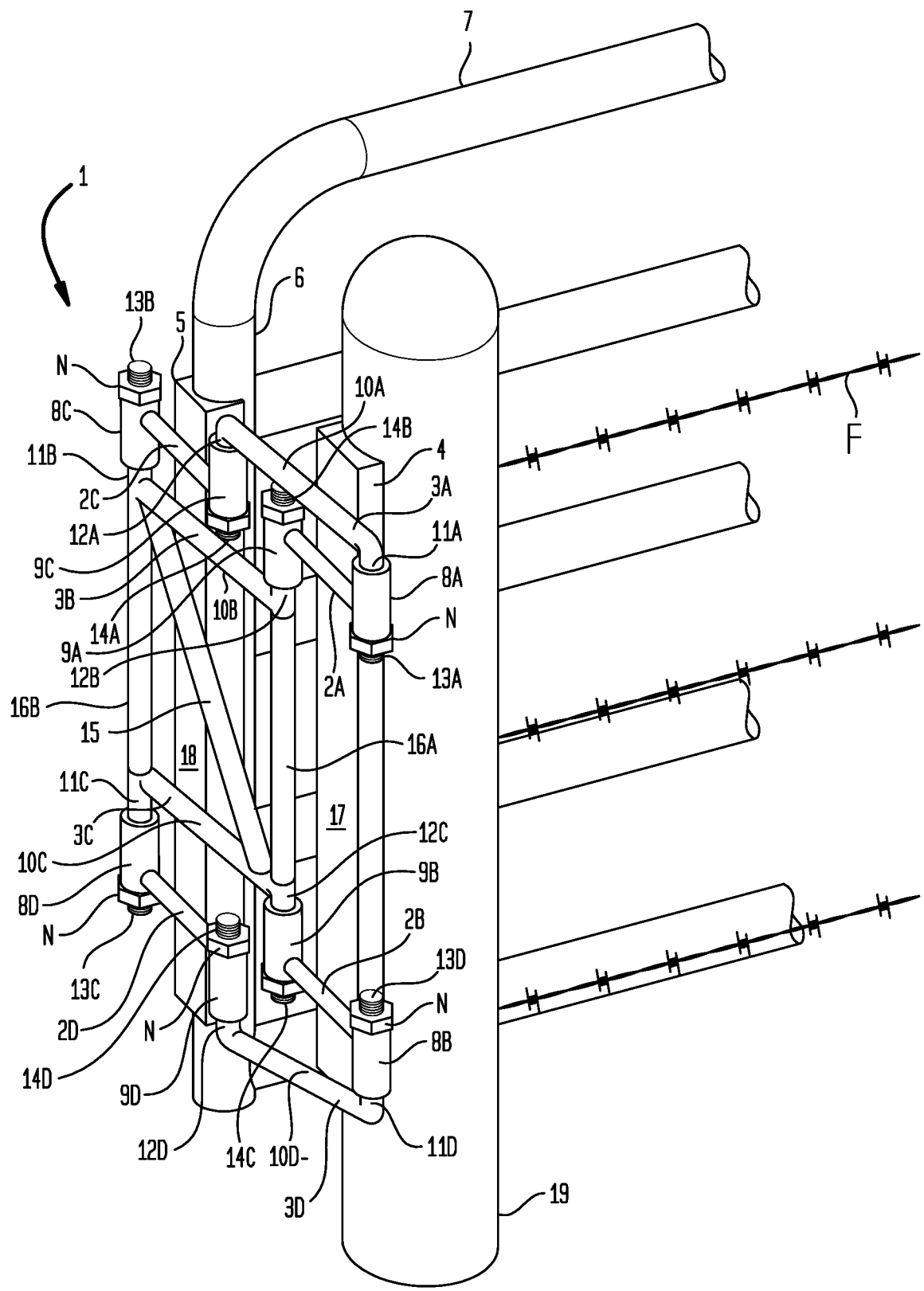
FIG. 4 is a side elevational view of an embodiment of a hinge, a portion of a gate, a post, and a portion of a fence illustrating an inward rotation of the gate.
Figure 5:
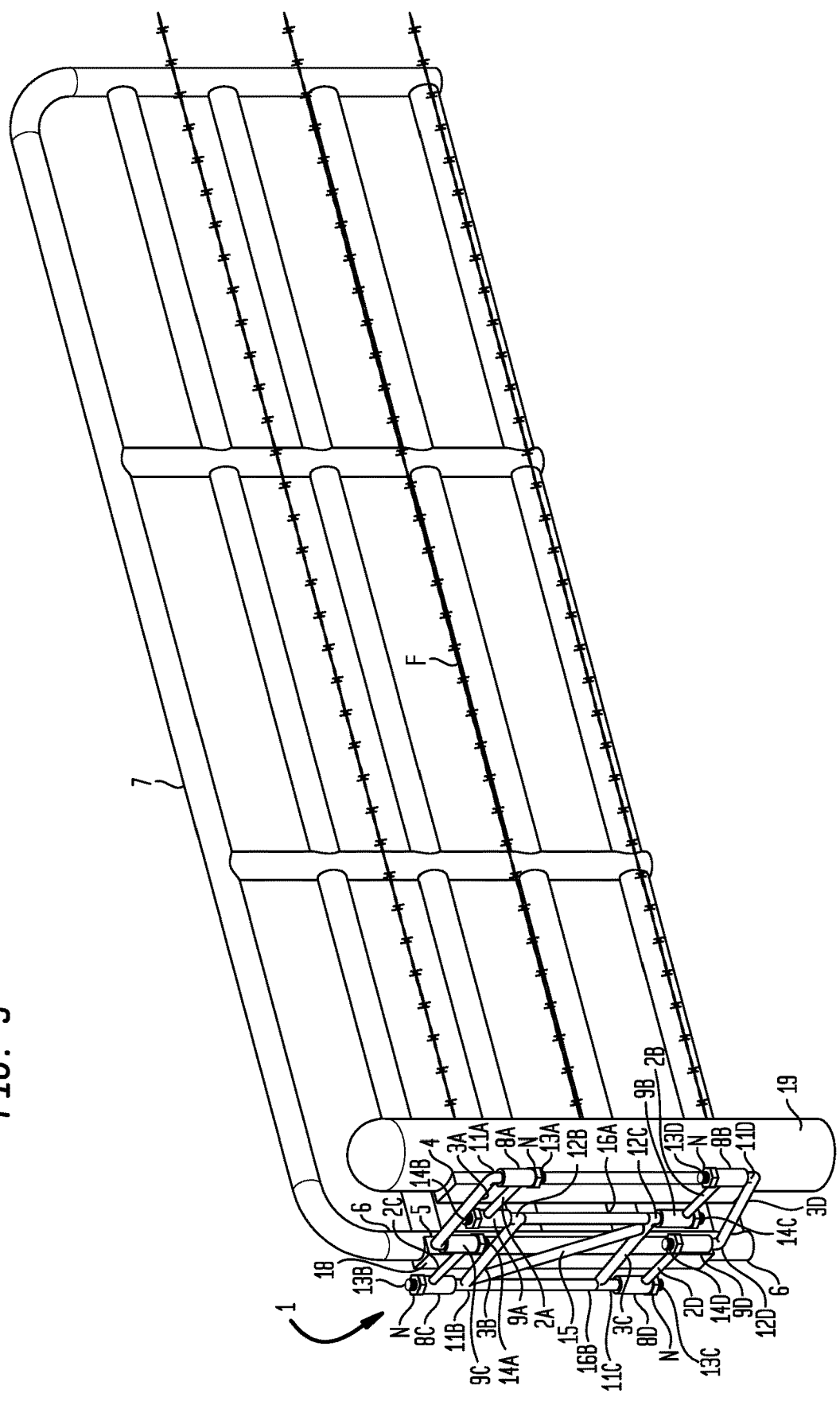
FIG. 5 is a side elevational view of an embodiment of a hinge, a gate, a post, and a portion of a fence illustrating an inward rotation of the gate.
Figure 6A:
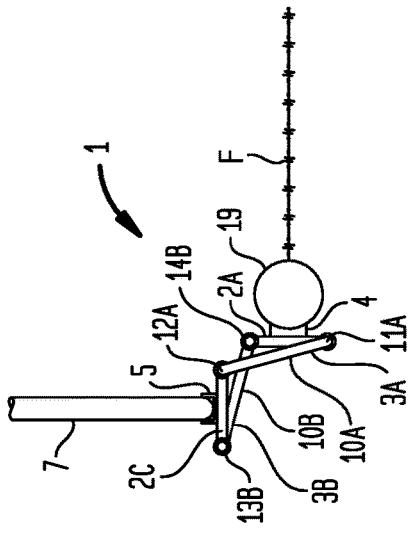
FIG. 6A is a top plan view of an embodiment of a hinge, a portion of a gate, a post, and a portion of a fence illustrating the gate in a closed position.
Figure 6B:
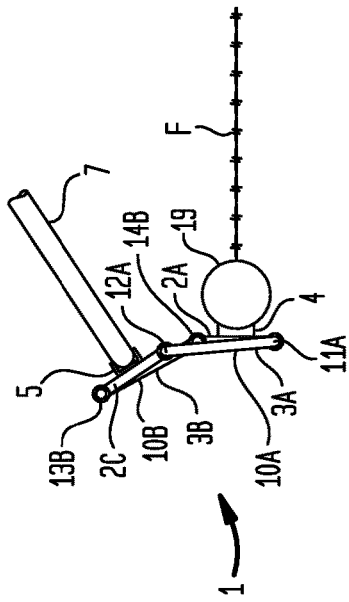
FIG. 6B is a top plan view of an embodiment of a hinge, a portion of a gate, a post, and a portion of a fence illustrating the gate swinging into the inward side of the fence.
Figure 6C:
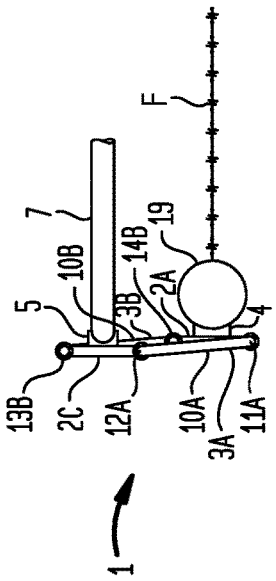
FIG. 6C is a top plan view of an embodiment of a hinge, a portion of a gate, a post, and a portion of a fence illustrating the gate swinging into the inward side of the fence.
Figure 6D:
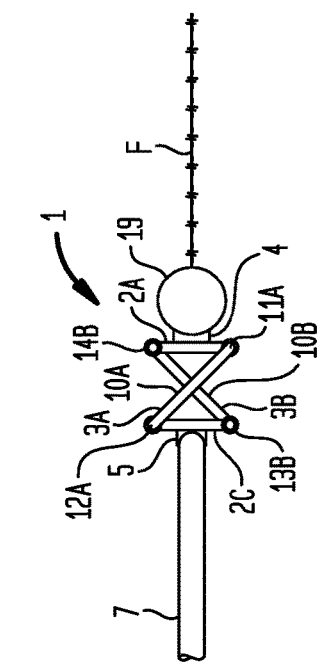
FIG. 6D is a top plan view of an embodiment of a hinge, a portion of a gate, a post, and a portion of a fence illustrating the gate swinging into the inward side of the fence.
Figure 6E:
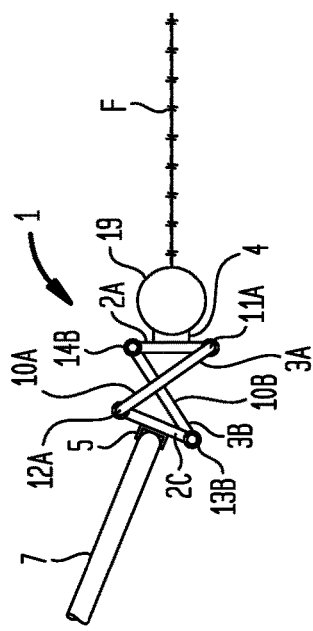
FIG. 6E is a top plan view of an embodiment of a hinge, a portion of a gate, a post, and a portion of a fence illustrating the gate swinging into the inward side of the fence.
Figure 6F:
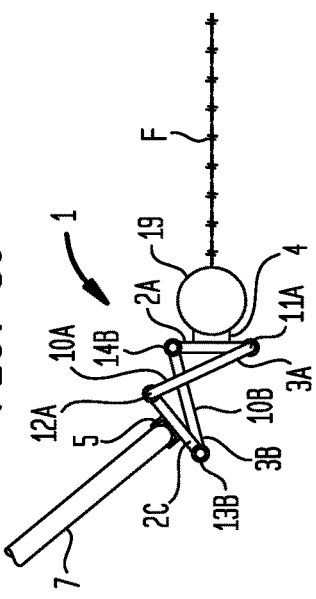
FIG. 6F is a top plan view of an embodiment of a hinge, a portion of a gate, a post, and a portion of a fence illustrating the gate swinging into the inward side of the fence.
Figure 8:
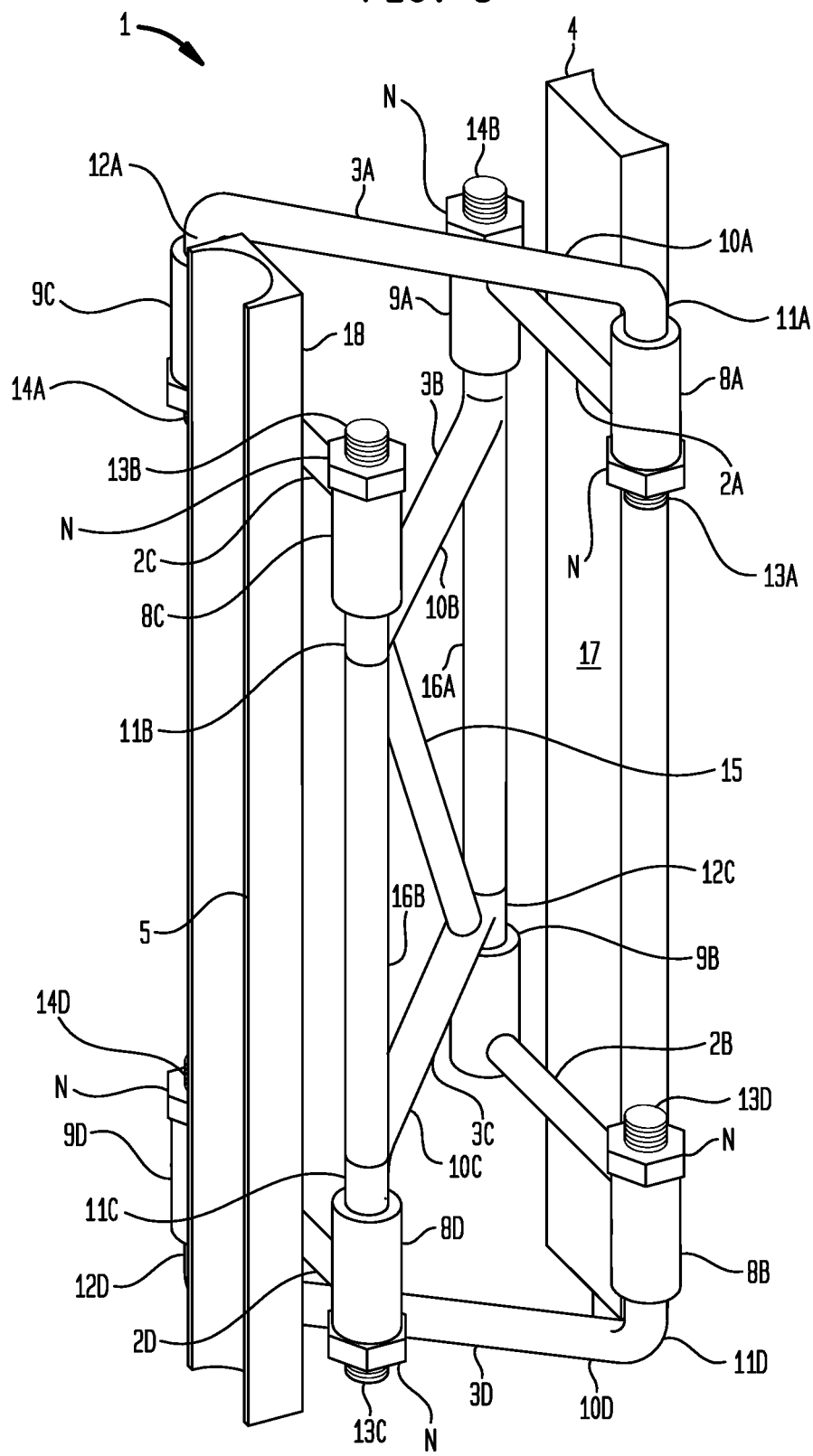
FIG. 8 is an isometric elevational view of an embodiment of a hinge, a post brace, and a gate brace.
Figure 9:
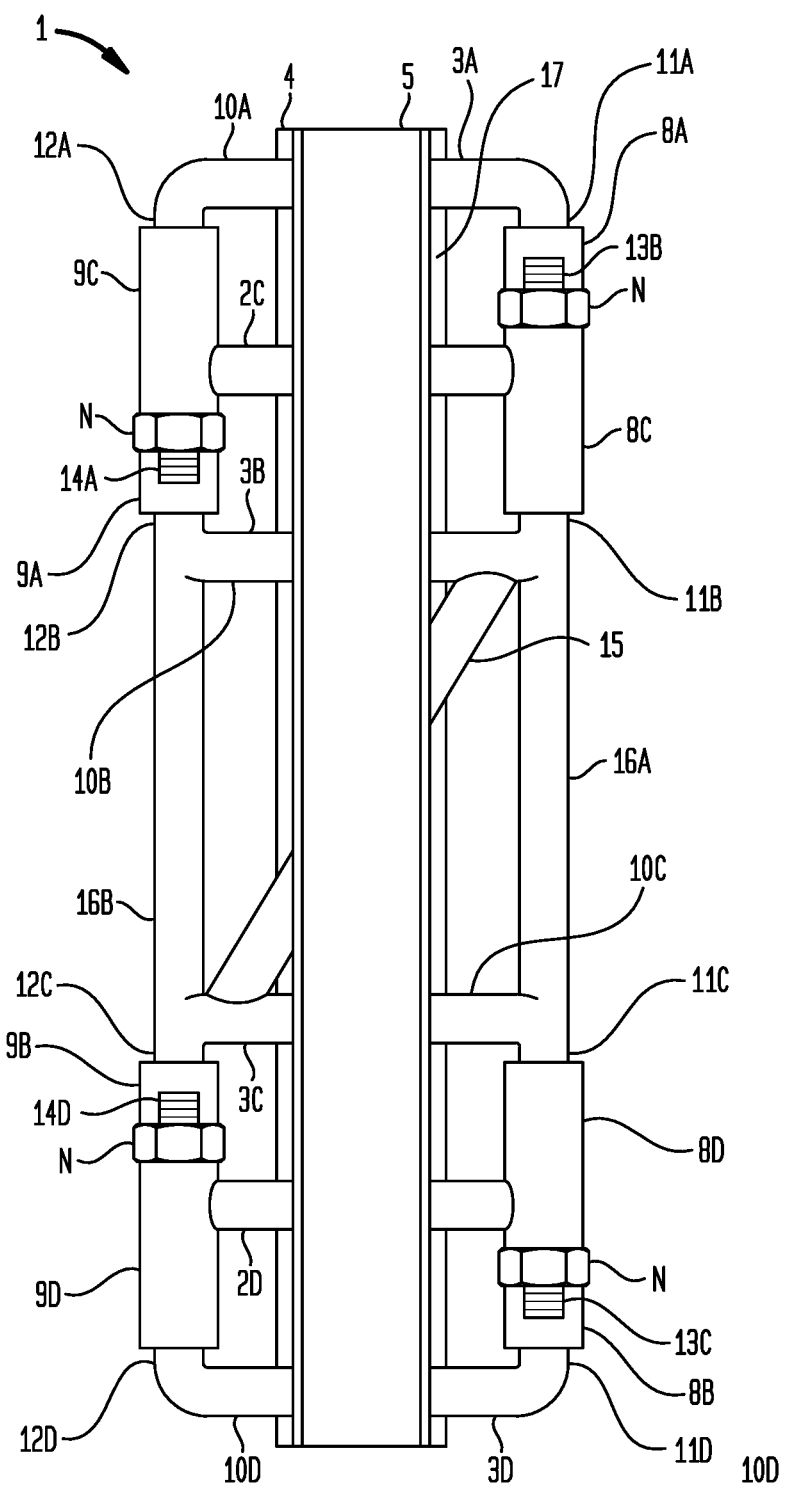
FIG. 9 is a front side view of an embodiment of a hinge, a post brace, and a gate brace.
Figure 10:
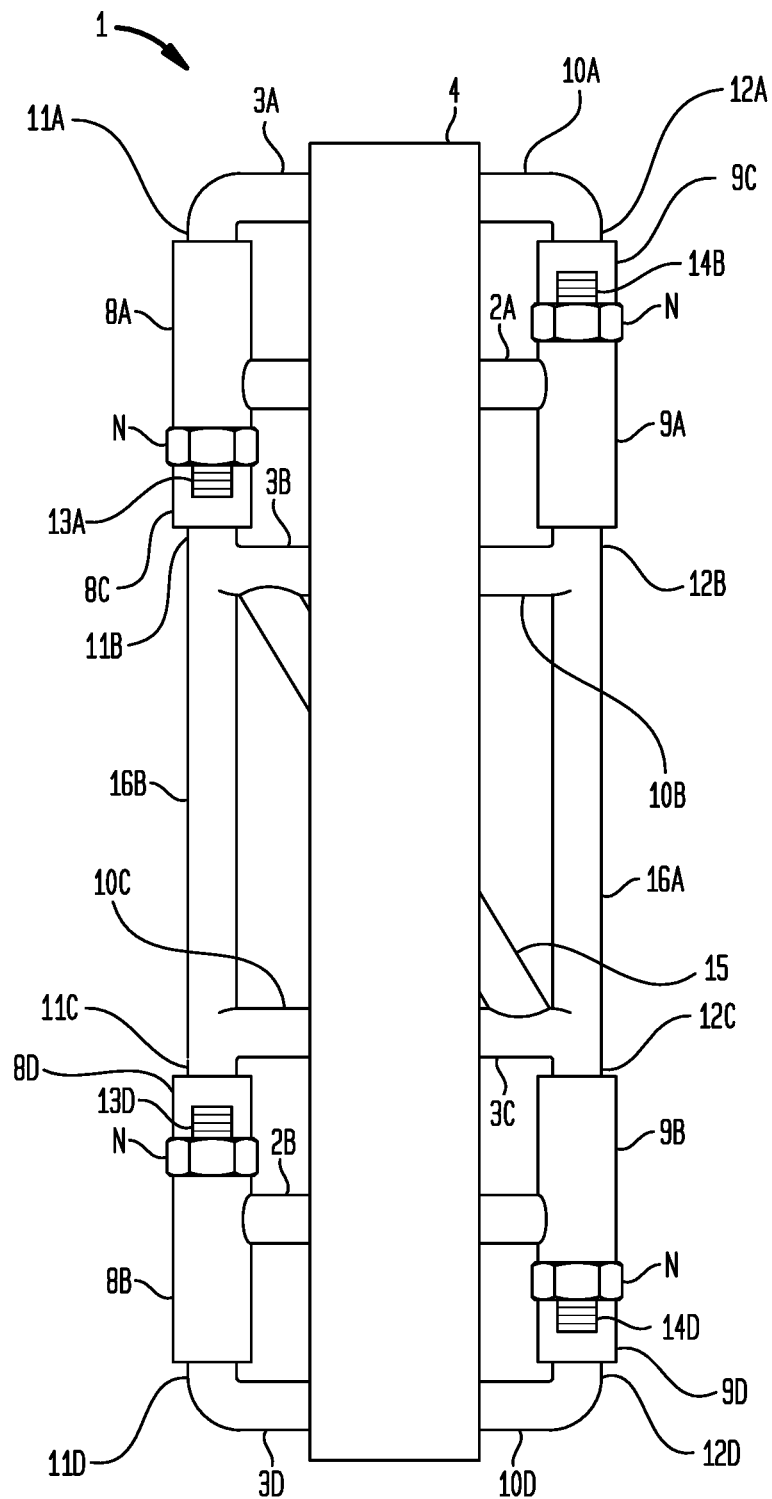
FIG. 10 is a back side view of an embodiment of a hinge and a post brace.
Figure 11:
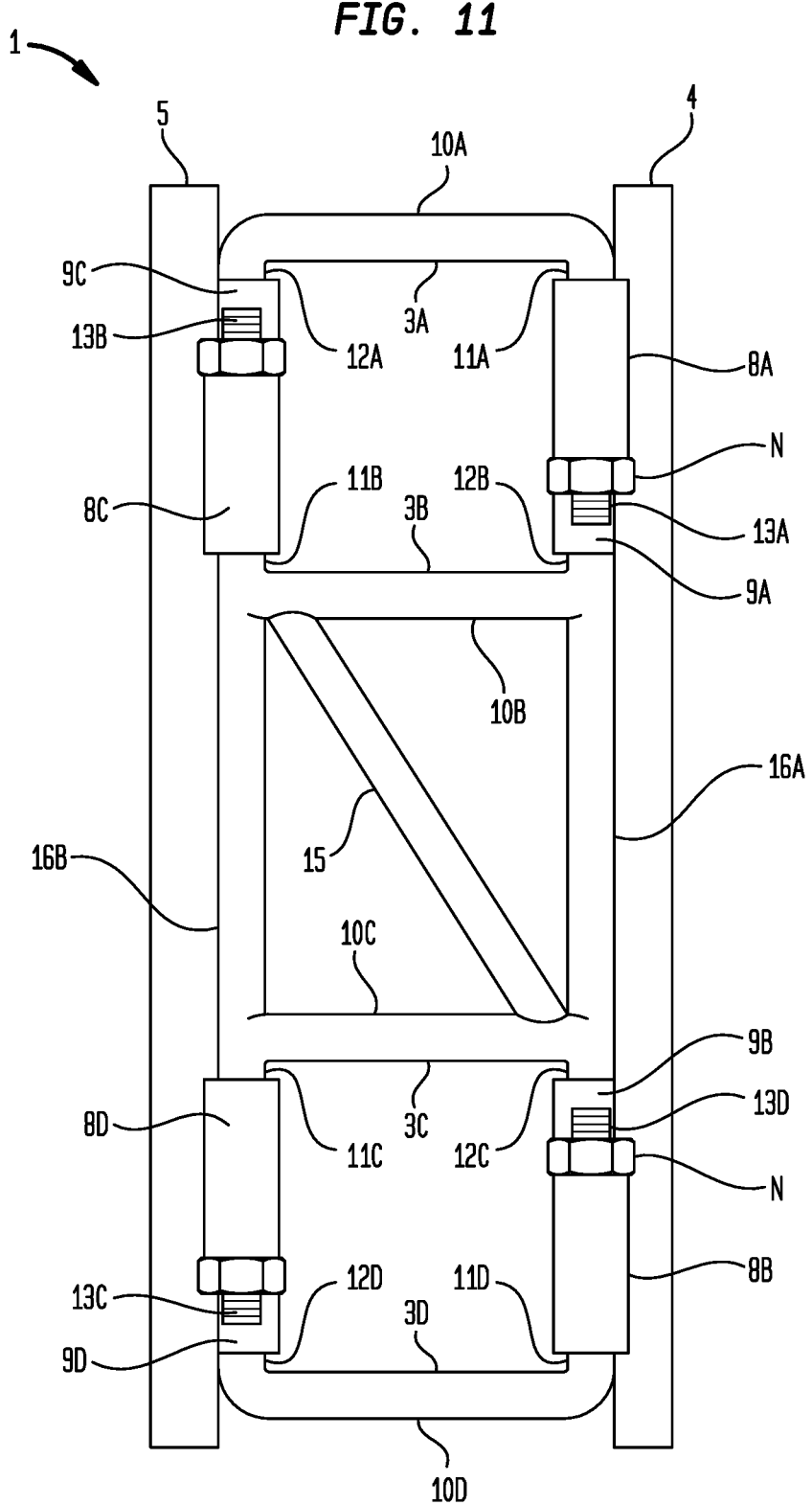
FIG. 11 is a left side view of an embodiment of a hinge, a post brace, and a gate brace.
Figure 12:
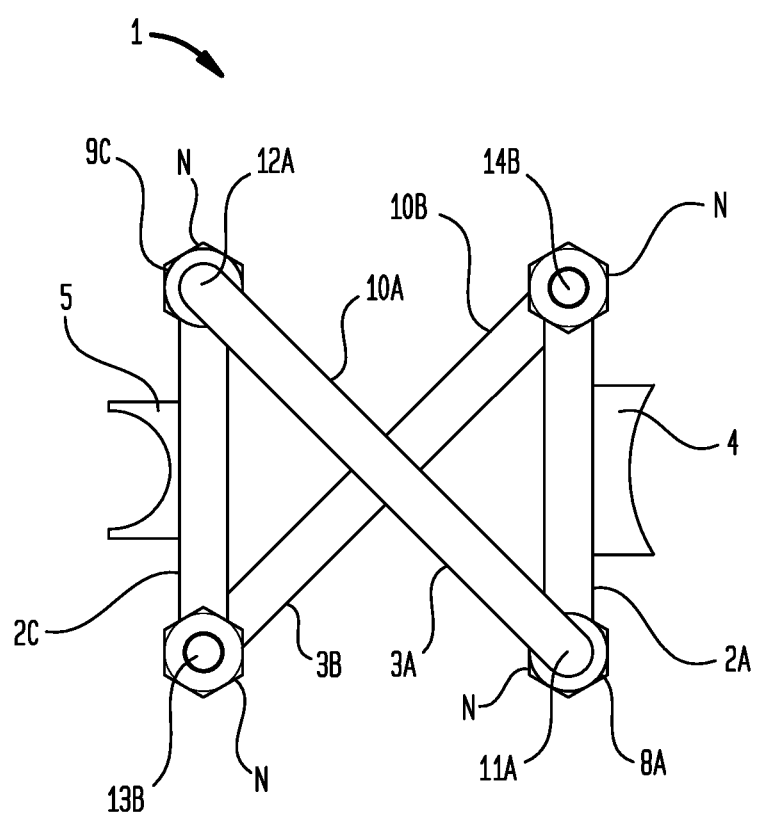
FIG. 12 is a top plan view of an embodiment of a hinge, a post brace, and a gate brace.

Now referring primarily to FIGS. 3 through 5, the hinge (1) can allow rotation of the gate (7) to both the inward side or outward side of the fence (F) attached to post (19), permitting the gate (7) to swing approximately 360 degrees with respect to the post (19). In securing the hinge (1) between post (19) and gate (7), the post (19) and gate (7) have a first vertical axis and a second vertical axis approximately parallel to one another. In mounting the gate (7), the act of coupling the first pintle portions (13A-13D) and the second pintle portions (14A-14D) of each of the crossbars (3A-3D) to the first gudgeons (8A-8D) and the second gudgeons (9A-9D) of the hinge members (2A-2D) in an offset geometry allows the rotation of the gate (7) to swing clear of the gateway entry space. In addition, adjoining the gate (7) to the inward side or outward side of the fence (7) with a chain or hook, for example, upon opening the gate (7) can prevent the gate (7) from rotating back to a closed position or towards the gateway entry space.

Referring primarily to FIGS. 6A-6F, the gate (7) can start in a closed position (FIG. 6A) with the gate (7) in planar extension with the stationary post (19). The gate (7) can rotate inward toward the fence (F) forming acute angles (FIG. 6A, FIG. 6B) with the post (19). In continuing to open the gate (7), the gate (7) can form an approximate 90 degree angle (FIG. 6D) with the post (19). In addition, the gate (7) can rotate beyond 90 degrees, forming obtuse angles (FIG. 6E, FIG. 6D) with the post (19).

Now referring primarily to FIGS. 7A-7F, the gate (7) can start in a closed position (FIG. 7A) with the gate (7) in planar extension with the stationary post (19). The gate (7) can rotate outward toward the fence (F) forming obtuse angles (FIG. 7A, FIG. 7B) with the post (19). In continuing to open the gate (7), the gate (7) can form an approximate 270 degree angle (FIG. 7D) with the post (19). In addition, the gate (7) can rotate beyond 270 degrees, forming acute angles (FIG. 7E, FIG. 7D) with the post (19).

Referring primarily to FIGS. 8 through 12 and with continuing reference to FIG. 1, embodiments of the hinge (1) can form a quadrilateral shape with four edges and four vertices, as secured between post brace (4) and gate brace (5). Post brace (4) and gate brace (5) can be chamfered on one side to easily attach to post (19) or the hinge end (6) of the gate (7). The outward facing surface (17) of the post brace (4) and outward facing surface (18) of the gate brace (5) can be substantially planar for attaching the corresponding hinge members (2A-2D). The inside geometry of the hinge (1) can include a diagonal support bar (15) traversing between first (16A) and second (16B) vertical bars to partially close up the inside geometry of the hinge (1), in order to prevent a calf or smaller domesticated animal from getting caught in the hinge (1).

Various embodiments further include use and operation sequences or data implemented in accordance with the foregoing description of the hinge (1).

As can be easily understood from the foregoing, the basic concepts of the present invention may be embodied in a variety of ways. The invention involves numerous and varied embodiments of a hinge, methods of mounting a gate, and methods of using a gate, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) the hinge article disclosed and described, ii) each of the related methods disclosed and described, iii) similar, equivalent, and even implicit variations of each of the article and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A hinge, comprising:
   first, second, third, and fourth hinge members and first, second, third, and fourth crossbars; said first hinge member and said second hinge member removably coupled to a post along a first vertical axis of said post; said third hinge member and said fourth hinge member removably coupled to a hinge end of a gate along a second vertical axis of said gate; said first, second, third, and fourth crossbars in interpivoting connection with said first, second, third, and fourth hinge members;
   said first hinge member comprising a horizontal bar having a first end with a first gudgeon protruding in a first direction and a second end with a second gudgeon protruding in a second direction opposite said first direction; said third hinge member comprising a horizontal bar having a first end with a first gudgeon protruding in said second direction and a second end with a second gudgeon protruding in said first direction;
   said first crossbar comprising an elongated shank portion, a first pintle portion protruding in said second direction, a second pintle portion protruding in said second direction; said second crossbar comprising an elongated shank portion, a first pintle portion protruding in said first direction, a second pintle portion protruding in said first direction;
   wherein said first pintle portion of said first crossbar is inserted in said first gudgeon of said first hinge member, said second pintle portion of said first crossbar is inserted in said second gudgeon of said third hinge member, said first pintle portion of said second crossbar is inserted in said first gudgeon of said third hinge member, and said second pintle portion of said second crossbar is inserted in said second gudgeon of said first hinge member;
   wherein said hinge operable to rotate said gate to either an inward side of a fence or an outward side of said fence; and said hinge permitting said gate to swing approximately 360 degrees with respect to said post.

2. The hinge of claim 1, wherein said second hinge member comprising a horizontal bar having a first end with a first gudgeon protruding in said second direction and a second end with a second gudgeon protruding in said first direction, said second hinge member configured to be removably coupled to said post of said fence; said fourth hinge member comprising a horizontal bar having a first end with a first gudgeon protruding in said first direction and a second end with a second gudgeon protruding in said second direction, said fourth hinge member configured to be removably coupled to said gate;
   said third crossbar comprising an elongated shank portion, a first pintle portion protruding in said second direction, a second pintle portion protruding in said second direction; said fourth crossbar comprising an elongated shank portion, a first pintle portion protruding in said first direction, a second pintle portion protruding in said first direction;
   wherein said first pintle portion of said third crossbar is inserted in said first gudgeon of said fourth hinge member, said second pintle portion of said third crossbar is inserted in said second gudgeon of said second hinge member, said first pintle portion of said fourth crossbar is inserted in said first gudgeon of said second hinge member, and said second pintle portion of said fourth crossbar is inserted in said second gudgeon of said fourth hinge member.

3. The hinge of claim 2, further comprising a diagonal support bar extending between said elongated shank portion of said second crossbar and said elongated shank portion of said third crossbar.

4. The hinge of claim 2, wherein said hinge further comprising a first vertical support bar and a second vertical support bar, said first vertical support bar disposed between said elongated shank portion of said second crossbar and said elongated shank portion of said third crossbar in alignment with an axis along said first pintle portion of said second crossbar and said first pintle portion of said third crossbar, said second vertical support bar disposed between said elongated shank portion of said second crossbar and said elongated shank portion of said third crossbar in alignment with an axis along said second pintle portion of said second crossbar and said second pintle portion of said third crossbar.

5. The hinge of claim 1, further comprising a post brace, wherein said first hinge member and said second hinge member coupled to said post brace and said post brace removably coupled to said post.

6. The hinge of claim 1, further comprising a gate brace, wherein said third hinge member and said fourth hinge member coupled to said gate brace and said gate brace removably coupled to said gate.

7. A method of mounting a gate, comprising:
   securing a hinge between a post and said gate, said post having a first vertical axis and said gate having a second vertical axis, said first vertical axis and said second vertical axis approximately parallel to one another; said hinge including:

first, second, third, and fourth hinge members and first, second, third, and fourth cross bars crossbars, said first hinge member and said second hinge member removably coupled to said post along said first vertical axis of said post, said third hinge member and said fourth hinge member removably coupled to a hinge end of said gate along said second vertical axis of said gate, said first, second, third, and fourth crossbars in interpivoting connection with said first, second, third, and fourth hinge members;

said first hinge member comprising a horizontal bar having a first end with a first gudgeon protruding in a first direction and a second end with a second gudgeon protruding in a second direction opposite said first direction, said first hinge member configured to be removably coupled to said post of a fence;

said third hinge member comprising a horizontal bar having a first end with a first gudgeon protruding in said second direction and a second end with a second gudgeon protruding in said first direction, said third hinge member configured to be removably coupled to said gate;

said first crossbar comprising an elongated shank portion, a first pintle portion protruding in said second direction, a second pintle portion protruding in said second direction;

said second crossbar comprising an elongated shank portion, a first pintle portion protruding in said first direction, a second pintle portion protruding in said first direction;

wherein said first pintle portion of said first crossbar is inserted in said first gudgeon of said first hinge member, said second pintle portion of said first crossbar is inserted in said second gudgeon of said third hinge member, said first pintle portion of said second crossbar is inserted in said first gudgeon of said third hinge member, and said second pintle portion of said second crossbar is inserted in said second gudgeon of said first hinge member;

wherein said hinge operable to rotate said gate to either an inward side of said fence or an outward side of said fence; said hinge permitting said gate to swing approximately 360 degrees with respect to said post.

8. The method of mounting a gate of claim 7, wherein said hinge further includes: a second hinge member comprising a horizontal bar having a first end with a first gudgeon protruding in said second direction and a second end with a second gudgeon protruding in said first direction, said second hinge member configured to be removably coupled to said post of said fence;

said fourth hinge member comprising a horizontal bar having a first end with a first gudgeon protruding in said first direction and a second end with a second gudgeon protruding in said second direction, said fourth hinge member configured to be removably coupled to said gate;

said third crossbar comprising an elongated shank portion, a first pintle portion protruding in said second direction, a second pintle portion protruding in said second direction;

said fourth crossbar comprising an elongated shank portion, a first pintle portion protruding in said first direction, a second pintle portion protruding in said first direction;

wherein said first pintle portion of said third crossbar is inserted in said first gudgeon of said fourth hinge member, said second pintle portion of said third crossbar is inserted in said second gudgeon of said second hinge member, said first pintle portion of said fourth crossbar is inserted in said first gudgeon of said second hinge member, and said second pintle portion of said fourth crossbar is inserted in said second gudgeon of said fourth hinge member.

9. The method of mounting a gate of claim 7, further comprising securing a post brace to said post, said post brace comprises an outward facing surface.

10. The method of mounting a gate of claim 9, further comprising securing said first hinge member and said second hinge member to said outward facing surface of said post brace along said first vertical axis of said post.

11. The method of mounting a gate of claim 7, further comprising securing a gate brace to said hinge end of said gate, said gate brace comprises an outward facing surface.

12. The method of mounting a gate of claim 11, further comprising attaching said third hinge member and said fourth hinge member to said outward facing surface of said gate brace along said second vertical axis of said gate.

13. A method of using a gate, comprising:

mounting a hinge between a post and a gate; said hinge including: first, second, third, and fourth hinge members and first, second, third, and fourth crossbars, said first hinge member and said second hinge member removably coupled to said post along a first vertical axis of said post, said third hinge member and said fourth hinge member removably coupled to a hinge end of said gate along a second vertical axis of said gate, said first, second, third, and fourth crossbars in interpivoting connection with said first, second, third, and fourth hinge members;

said first hinge member comprising a horizontal bar having a first end with a first gudgeon protruding in a first direction and a second end with a second gudgeon protruding in a second direction opposite said first direction, said first hinge member configured to be removably coupled to said post of a fence;

said third hinge member comprising a horizontal bar having a first end with a first gudgeon protruding in said second direction and a second end with a second gudgeon protruding in said first direction, said third hinge member configured to be removably coupled to a gate;

said first crossbar comprising an elongated shank portion, a first pintle portion protruding in said second direction, a second pintle portion protruding in said second direction;

said second crossbar comprising an elongated shank portion, a first pintle portion protruding in said first direction, a second pintle portion protruding in said first direction;

wherein said first pintle portion of said first crossbar is inserted in said first gudgeon of said first hinge member, said second pintle portion of said first crossbar is inserted in said second gudgeon of said third hinge member, said first pintle portion of said second crossbar is inserted in said first gudgeon of said third hinge member, and said second pintle portion of said second crossbar is inserted in said second gudgeon of said first hinge member;

wherein said hinge operable to rotate said gate to either an inward side of said fence or an outward side of said fence;

rotating said gate approximately 180 degrees in an inward direction; and rotating said gate approximately 180 degrees in an outward direction.

14. The method of using a gate of claim 13, wherein the hinge further includes:

said second hinge member comprising a horizontal bar having a first end with a first gudgeon protruding in said second direction and a second end with a second gudgeon protruding in said first direction, said second hinge member configured to be removably coupled to said post of said fence;

said fourth hinge member comprising a horizontal bar having a first end with a first gudgeon protruding in said first direction and a second end with a second gudgeon protruding in said second direction, said fourth hinge member configured to be removably coupled to said gate;

said third crossbar comprising an elongated shank portion, a first pintle portion protruding in said second direction, a second pintle portion protruding in said second direction;

said fourth crossbar comprising an elongated shank portion, a first pintle portion protruding in said first direction, a second pintle portion protruding in said first direction;

wherein said first pintle portion of said third crossbar is inserted in said first gudgeon of said fourth hinge member, said second pintle portion of said third crossbar is inserted in said second gudgeon of said second hinge member, said first pintle portion of said fourth crossbar is inserted in said first gudgeon of said second hinge member, and said second pintle portion of said fourth crossbar is inserted in said second gudgeon of said fourth hinge member.

15. The method of using a gate of claim 13, further comprising adjoining said gate to an inward side of said fence attached to said post.

16. The method of using a gate of claim 15, further comprising adjoining said gate to an outward side of said fence attached to said post.

17. The method of using a gate of claim 16, further comprising rotating said gate approximately 360 degrees with respect to said post.

* * * * *